June 1, 1926.
O. A. JOHNSON ET AL
STORAGE BATTERY PLATE
Filed July 14, 1923
1,587,326
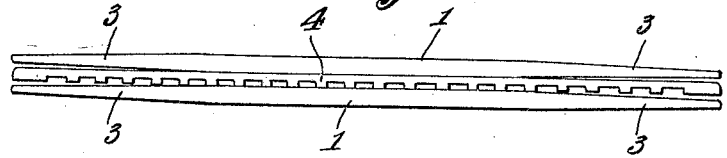
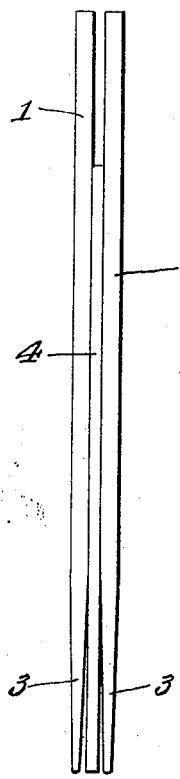
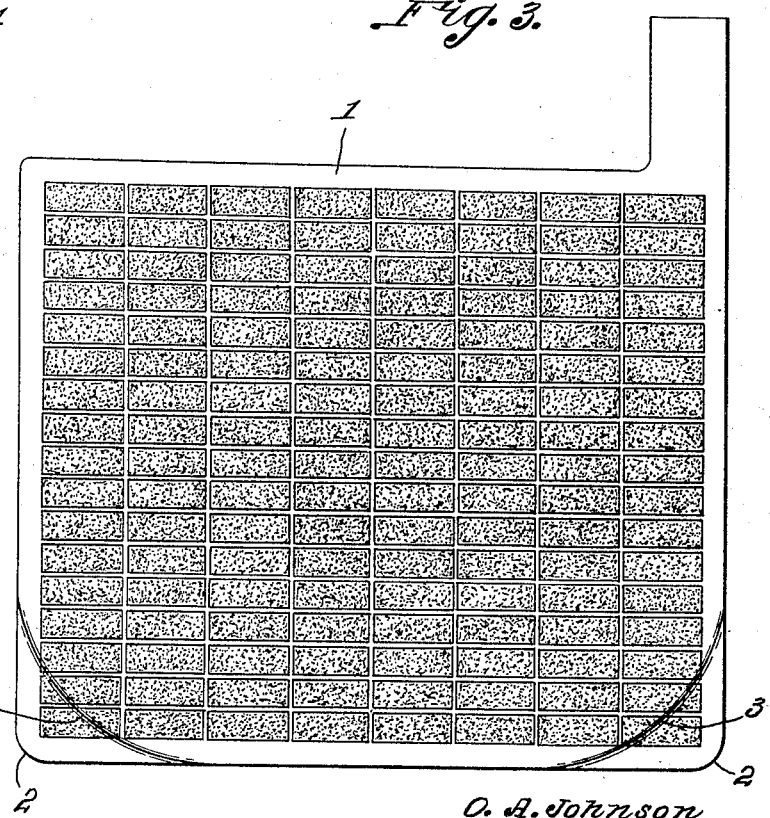
O. A. Johnson
G. A. Stowasser
INVENTOR
BY Victor J. Evans
ATTORNEY
WITNESS:

Patented June 1, 1926.

1,587,326

UNITED STATES PATENT OFFICE.

OSCAR A. JOHNSON AND GEORGE A. STOWASSER, OF MINNEAPOLIS, MINNESOTA.

STORAGE-BATTERY PLATE.

Application filed July 14, 1923. Serial No. 651,608.

The present invention has reference to storage batteries, and is especially directed to the plates for such batteries.

In the construction of plates for ordinary storage batteries, the same are constructed in such a manner that the corners have sharp edges on the bottom thereof which chew through the separators and cause short circuiting when the plates buckle.

The present invention is designed to effectively obviate this defect by producing battery plates shaped in such a way that they have rounded and tapered corners which increase the distance between the positive and negative plates at their corners so that the battery will give longer service without re-insulating.

To the attainment of the foregoing and other objects which will present themselves as the nature of the invention is better understood, reference is to be had to the drawing which accompanies and which forms part of this application.

In the drawings:—

Figure 1 is a bottom plan view of two battery plates in accordance with the invention spaced away from each other by the ordinary separator.

Figure 2 is an end view thereof.

Figure 3 is a plan view of one of the plates.

In the drawing, it has not been deemed necessary to illustrate the battery box and in Figures 1 and 2 we have shown only two of the plates. The plates are of the ordinary material and construction, except that the bottom corners of each of the plates 1 is rounded, as at 2 and the body of the plates have their sides tapered inwardly, as at 3 to the said rounded corners. By such arrangement the rounded and reduced corners are sustained out of contact with the separator 4 and the distance between the corners of the plates and the positive and negative plates on the corners of the battery is materially increased so that liability of contact therebetween is overcome as is the danger of short circuiting incident to buckling plates "chewing" through the separators. Consequently the life of the batery is greatly increased.

Having described the invention, we claim:—

A battery plate having its body portion of an equal thickness throughout and having its lower corners rounded and its opposite faces at an equidistance from said corners beveled inwardly to the said corners.

In testimony whereof we affix our signatures.

OSCAR A. JOHNSON.
GEORGE A. STOWASSER.